(12) United States Patent
Lim et al.

(10) Patent No.: US 12,354,614 B2
(45) Date of Patent: Jul. 8, 2025

(54) SPEECH CODING METHOD AND APPARATUS FOR PERFORMING THE SAME

(71) Applicants: Electronics and Telecommunications Research Institute, Daejeon (KR); The Trustees of Indiana University, Indianapolis, IN (US)

(72) Inventors: Woo-taek Lim, Sejong-si (KR); Seung Kwon Beack, Daejeon (KR); Inseon Jang, Daejeon (KR); Jongmo Sung, Daejeon (KR); Tae Jin Lee, Daejeon (KR); Byeongho Cho, Daejeon (KR); Minje Kim, Bloomington, IN (US); Haici Yang, Bloomington, IN (US)

(73) Assignees: ELECTRONICS AND TELECOMMUNICATIONS RESEARCH INSTITUTE, Daejeon (KR); THE TRUSTEES OF INDIANA UNIVERSITY, Indianapolis, IN (US)

( * ) Notice: Subject to any disclaimer, the term of this patent is extended or adjusted under 35 U.S.C. 154(b) by 15 days.

(21) Appl. No.: 18/474,997

(22) Filed: Sep. 26, 2023

(65) Prior Publication Data
US 2024/0013796 A1 Jan. 11, 2024

Related U.S. Application Data

(60) Provisional application No. 63/420,438, filed on Oct. 28, 2022.

(30) Foreign Application Priority Data

Aug. 4, 2023 (KR) .................. 10-2023-0102244

(51) Int. Cl.
*G10L 19/07* (2013.01)
*G10L 19/038* (2013.01)

(52) U.S. Cl.
CPC ............ *G10L 19/038* (2013.01); *G10L 19/07* (2013.01)

(58) Field of Classification Search
CPC ................................ G10L 19/07; G10L 19/00
See application file for complete search history.

(56) References Cited

U.S. PATENT DOCUMENTS

| 2010/0023324 | A1* | 1/2010 | Gournay | G10L 19/06 704/219 |
| 2013/0253922 | A1* | 9/2013 | Ehara | G10L 19/005 704/219 |

(Continued)

FOREIGN PATENT DOCUMENTS

| CN | 106203624 B | * | 6/2019 | ............. G06N 3/084 |
| CN | 111477216 B | * | 2/2024 | ......... G06F 16/3329 |
| KR | 10-2021-0095010 | | 7/2021 | |

OTHER PUBLICATIONS

Subramani, et al., "End-to-end LPCNet: A Neural Vocoder With Fully-Differentiable LPC Estimation," arXiv 2022. (Year: 2022).*

(Continued)

*Primary Examiner* — Feng-Tzer Tzeng
(74) *Attorney, Agent, or Firm* — KILE PARK REED & HOUTTEMAN PLLC (57) ABSTRACT

A method of encoding a speech signal includes predicting a feature vector of each of a plurality of frames included in the speech signal based on a ground-truth feature vector of a previous frame of each of the plurality of frames, calculating a residual signal corresponding to each of the plurality of frames based on a ground-truth feature vector of each of the plurality of frames and a predicted feature vector of each of the plurality of frames, and generating a bitstring corresponding to each of the plurality of frames by quantizing the residual signal.

14 Claims, 6 Drawing Sheets

(56) References Cited

U.S. PATENT DOCUMENTS

2015/0073796 A1 3/2015 Kim et al.
2017/0140263 A1* 5/2017 Kaiser .................... G06N 3/044
2021/0090551 A1 3/2021 Jang et al.

OTHER PUBLICATIONS

F. Tzeng, "Analysis-by-Synthesis Linear Predictive Speech Coding at 4.8 kBit/s and Below," B. S. Atal et al. (eds.), Advances in Speech Coding © Kluwer Academic Publishers 1991. (Year: 1991).*
Tzeng, "Analysis-by-Synthesis Linear Predictive Speech Coding at 4.8 kBit/s and Below," Advances in Speech Coding, Kluwer Academic Publishers 1991 (see attached reference in the previous Office action). (Year: 1991).*
Yang et al., "Neural Feature Predictor and Discriminative Residual Coding for Low-Bitrate Speech Coding", 5 total pages.
Valin et al., "LPCNet: Improving Neural Speech Synthesis Through Linear Prediction", Feb. 19, 2019, 5 total pages.

* cited by examiner

SPEECH CODING METHOD AND APPARATUS FOR PERFORMING THE SAME

CROSS-REFERENCE TO RELATED APPLICATION

This application claims the benefit of U.S. Provisional Application No. 63/420,438 filed on Oct. 28, 2022, in the U.S. Patent and Trademark Office, and claims the benefit of Korean Patent Application No. 10-2023-0102244 filed on Aug. 4, 2023, in the Korean Intellectual Property Office, the entire disclosures of which are incorporated herein by reference for all purposes.

BACKGROUND

1. Field of the Invention

One or more embodiments relate to a speech coding method and an apparatus for performing the same.

2. Description of the Related Art

Neural network-based speech coding provides benefits in terms of coding trade-off by removing redundancy within code and improving reconstruction quality.

The above description is information the inventor(s) acquired in the course of conceiving the present disclosure, or already possessed at the time, and is not necessarily art publicly known before the present application was filed.

SUMMARY

Embodiments provide a neural speech codec with low bitrate, high quality, low latency, and low complexity using neural feature prediction to reduce temporal redundancy from a sequence of feature frames.

However, technical goals are not limited to the foregoing goals, and there may be other technical goals.

According to an aspect, there is provided a method of encoding a speech signal including predicting a feature vector of each of a plurality of frames included in the speech signal based on a ground-truth feature vector of a previous frame of each of the plurality of frames, calculating a residual signal corresponding to each of the plurality of frames based on a ground-truth feature vector of each of the plurality of frames and a predicted feature vector of each of the plurality of frames, and generating a bitstring corresponding to each of the plurality of frames by quantizing the residual signal.

The predicting of the feature vector of each of the plurality of frames may include reconstructing a feature vector of the previous frame using a quantized residual signal corresponding to the previous frame and a predicted feature of the previous frame, and obtaining the predicted feature vector of each of the plurality of frames from a reconstructed feature vector of the previous frame using a recurrent neural network.

The generating of the bitstring may include determining a threshold value based on a target bitrate for the bitstring and applying a first quantization scheme or a second quantization scheme to the residual signal based on the residual signal and the threshold value.

The first quantization scheme may use a larger codebook than the second quantization scheme.

The recurrent neural network may include a gated recurrent unit.

According to an aspect, there is provided a method of decoding a speech signal including obtaining quantized residual signals corresponding to a plurality of frames of the speech signal, predicting a feature vector of each of the plurality of frames based on a quantized residual signal corresponding to a previous frame of each of the plurality of frames, reconstructing a feature vector of each of the plurality of frames using a predicted feature vector of each of the plurality of frames and a quantized residual signal corresponding to each of the plurality of frames, and reconstructing the speech signal using a reconstructed feature vector of each of the plurality of frames.

The predicting of the feature vector of each of the plurality of frames may include reconstructing a feature vector of the previous frame using a predicted feature vector of the previous frame and a quantized residual signal corresponding to the previous frame, and obtaining the predicted feature vector of each of the plurality of frames from a reconstructed feature vector of the previous frame using a recurrent neural network.

The reconstructing of the speech signal may include generating a reconstructed speech signal corresponding to the speech signal by inputting the reconstructed feature vector to a neural vocoder.

The recurrent neural network may include a gated recurrent unit.

The neural vocoder may include an LPCNet (linear predictive coding network) vocoder.

According to an aspect, there is provided an apparatus for encoding a speech signal including a memory configured to store instructions and a processor electrically connected to the memory and configured to execute the instructions. When the instructions are executed by the processor, the processor may be configured to perform a plurality of operations. The plurality of operations may include predicting a feature vector of each of a plurality of frames included in the speech signal based on a ground-truth feature vector of a previous frame of each of the plurality of frames, calculating a residual signal corresponding to each of the plurality of frames based on a ground-truth feature vector of each of the plurality of frames and a predicted feature vector of each of the plurality of frames, and generating a bitstring corresponding to each of the plurality of frames by quantizing the residual signal.

The predicting of the feature vector of each of the plurality of frames may include reconstructing a feature vector of the previous frame using a quantized residual signal corresponding to the previous frame and a predicted feature vector of the previous frame, and obtaining the predicted feature vector of each of the plurality of frames from a reconstructed feature vector of the previous frame using a recurrent neural network.

The generating of the bitstring may include determining a threshold value based on a target bitrate for the bitstring and applying a first quantization scheme or a second quantization scheme to the residual signal based on the residual signal and the threshold value.

The first quantization scheme may use a larger codebook than the second quantization scheme.

The recurrent neural network may include a gated recurrent unit.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

The following detailed structural or functional description is provided as an example only and various alterations and modifications may be made to the embodiments. Accordingly, the embodiments are not to be construed as limited to the disclosure and should be understood to include all changes, equivalents, or replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that, if one component is described as being "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, components or combinations thereof, but do not preclude the presence or addition of one or more other features, integers, steps, operations, elements, components or combinations thereof.

Unless otherwise defined, all terms, including technical and scientific terms, used herein have the same meaning as commonly understood by one of ordinary skill in the art to which the present disclosure pertains. Terms, such as those defined in commonly used dictionaries, should be construed to have meanings matching with contextual meanings in the relevant art and the present disclosure, and are not to be construed to have an ideal or excessively formal meaning unless otherwise defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more of functions. For example, according to an example, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more of processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate one or more of central processing units (CPUs) within a device or a security multimedia card. In addition, "unit" may include one or more of processors.

Hereinafter, the embodiments are described in detail with reference to the accompanying drawings. When describing the embodiments with reference to the accompanying drawings, like reference numerals refer to like elements and a repeated description related thereto will be omitted.

Figure 1:
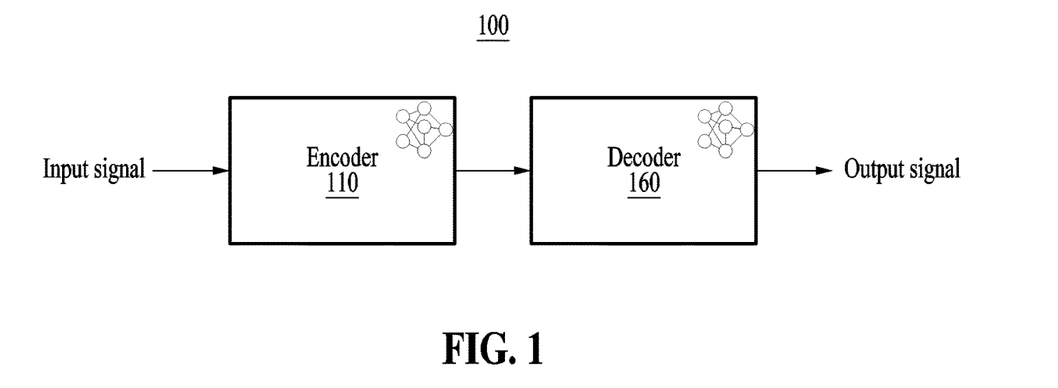
FIG. 1 is a diagram illustrating a coding system according to an embodiment.

FIG. 1 is a diagram illustrating a coding system according to an embodiment.

Referring to FIG. 1, according to an embodiment, a coding system 100 may include an encoder 110 and a decoder 160.

The encoder 110 may encode an input audio signal (e.g., an audio signal and a speech signal) including a plurality of frames using a neural network (e.g., a recurrent neural network such as a gated recurrent unit (GRU)) and may generate a bitstring (or bitstream). The encoder 110 is described in detail with reference to FIGS. 2 to 4.

The decoder 160 may receive the bitstring from the encoder 110 and reconstruct the input audio signal using the neural network (e.g., a recurrent neural network such as a GRU and LPCNet). The decoder 160 is described in detail with reference to FIGS. 2 and 5.

Figure 2:
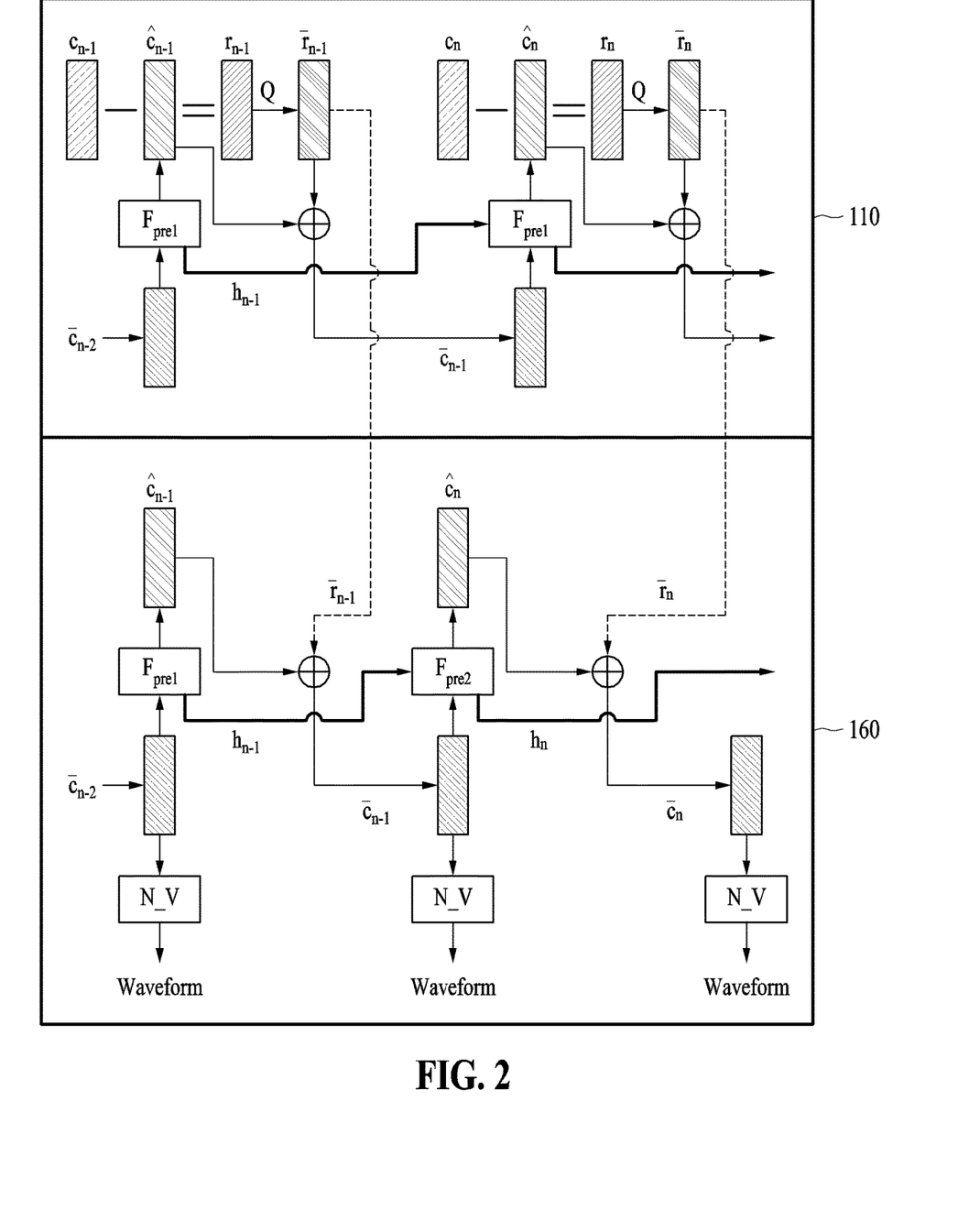
FIG. 2 is a diagram illustrating an encoder and a decoder according to an embodiment.

FIG. 2 is a diagram illustrating an encoder and a decoder according to an embodiment.

Referring to FIG. 2, according to an embodiment, the encoder 110 may include a predictor ($F_{pre1}$). The predictor ($F_{pre1}$) may predict feature vectors corresponding to a plurality of frames using a recurrent neural network (e.g., a GRU). The predictor ($F_{pre1}$) included in the encoder 110 may be substantially the same as a predictor ($F_{pre2}$) included in the decoder 160. The encoder 110 may individually generate bitstrings corresponding to the plurality of frames by quantizing residual signals (e.g., residual signals ($r_{N-1}$ and $r_n$)) corresponding to the plurality of frames of an input audio signal (e.g., the input audio signal of FIG. 1).

The encoder 110 may obtain ground-truth vectors (e.g., ground-truth vectors ($c_{n-1}$ and $c_n$)) of the plurality of frames (e.g., an n-th frame and an n-1-th frame). The encoder 110 may predict a feature vector of each of the plurality of frames from the ground-truth feature vectors using a recurrent neural network (e.g., a GRU)-based predictor ($F_{pre1}$).

Hereinafter, for ease of description, considering the characteristic of the recurrent neural network, the description is provided under the assumption that the n-th frame and the n−1-th frame among the plurality of frames are a next frame and a previous frame, respectively.

The encoder 110 may generate a residual signal ($c_{n-1}$) corresponding to the previous frame (e.g., the n−1-th frame) using a ground-truth feature vector ($\hat{c}_{n-1}$) of the previous frame and a predicted feature vector ($r_{n-1}$) of the previous frame. The encoder 110 may generate a bitstring corresponding to the previous frame by quantizing the residual signal ($r_{n-1}$) corresponding to the previous frame. The encoder 110 may apply discriminative coding to the residual signal. The discriminative coding is described in detail with reference to FIG. 3.

The encoder 110 may reconstruct a feature vector of the previous frame using the predicted feature vector ($\hat{c}_{n-1}$) of the previous frame and the quantized residual signal ($\bar{r}_{n-1}$) corresponding to the previous frame. The encoder 110 may predict a feature vector of the next frame (e.g., the n-th frame) using the reconstructed feature vector ($\bar{c}_{n-1}$) of the previous frame and a hidden state ($h_{n-1}$) of a previous round. The encoder 110 may condition frame-level prediction using parameters (e.g., pitch parameters) used in a neural vocoder (N_V) (e.g., an LPCNet vocoder) included in the decoder 160. A prediction process of the encoder 110 may be expressed as Equation 1.

$$h_n = \mathcal{H}_{(\hat{c}_{n-1}+\bar{r}_{n-1}, h_{n-1}, m_n)}, \hat{c}_n = \tanh(Wh_n) \quad \text{[Equation 1]}$$

In Equation 1, $\mathcal{H}(\cdot)$ may denote a recurrent neural network cell (e.g., a GRU cell), tanh may denote an activation function, and W may denote a weight. Although a bias is omitted in Equation 1, a bias may be used as necessary.

An encoding process of the encoder 110 may be expressed as Equation 2.

$$\hat{c}_n = \mathcal{F}_{pred}(\bar{c}_{n-1})$$

$$r_n = c_n - \hat{c}_n$$

$$\bar{r}_n = \mathcal{Q}(r_n) \text{ (send it to the decoder)}$$

$$\bar{c}_n = \hat{c}_n + \bar{r}_n (\text{input for the next round n+1}) \quad \text{[Equation 2]}$$

In Equation 2, $\mathcal{F}_{pred}$ may denote a predictor and $\mathcal{Q}$ may denote a quantizer.

The encoder 110 may individually generate bitstrings corresponding to the plurality of frames by applying the above-described encoding process to the plurality of frames.

The encoder 110 may prevent a residual's contribution from being unnecessarily minimized by inputting the reconstructed feature vector ($\bar{c}_{n-1}$) instead of the ground-truth feature vector ($c_{n-1}$) of the previous frame to the predictor ($F_{pre1}$) to predict the feature vector of the next frame.

The encoder 110 may be trained based on a mean squared error between prediction and a target as expressed in Equation 3.

$$\mathcal{L} = MSE(c_n, \hat{c}_n) \quad \text{[Equation 3]}$$

The decoder 160 may include the predictor ($F_{pre2}$) and the neural vocoder (N_V). The predictor ($F_{pre2}$) may individually predict the feature vectors corresponding to the plurality of frames using the recurrent neural network (e.g., a GRU). The predictor ($F_{pre2}$) may be substantially the same as the predictor ($F_{pre1}$) of the encoder 110.

The decoder 160 may obtain quantized residual signals (e.g., quantized residual signals ($\bar{r}_{n-1}$ and $\bar{r}_n$)) corresponding to the plurality of frames. The quantized residual signals may be received from the encoder 110. The decoder 160 may reconstruct the feature vector of the previous frame using the predicted feature vector ($\hat{c}_{n-1}$) of the previous frame and the residual signal ($\bar{r}_{n-1}$) corresponding to the previous frame. The decoder 160 may predict the feature vector of the next frame using the reconstructed feature vector ($\bar{c}_{n-1}$) of the previous frame and the hidden state ($h_{n-1}$) of the previous round. The prediction process and reconstruction process of the decoder 160 may be expressed as Equation 4.

$$\hat{c}_n = \mathcal{F}_{pred}(\bar{c}_{n-1})$$

$$\bar{c}_n = \hat{c}_n + \bar{r}_n \quad \text{[Equation 4]}$$

In Equation 4, $\mathcal{F}_{pred}$ may denote a predictor.

The decoder 160 may generate waveforms corresponding to the plurality of frames from the reconstructed feature vectors (e.g., reconstructed feature vectors ($\bar{c}_{n-2}, \bar{c}_{n-1}$, and $\bar{c}_n$) using the neural vocoder (N_V) (e.g., the LPCNet vocoder). The neural vocoder (N_V) may receive one or more parameters (e.g., pitch parameters) and the reconstructed feature vectors (e.g., reconstructed feature vectors ($\bar{c}_{n-2}, \bar{c}_{N-1}$, and $\bar{c}_n$). The neural vocoder (N_V) may integrate LPC analysis into a neural generative model (e.g., WaveRNN). The neural generative model may calculate prediction for a sample index t using a sample predicted before T $\hat{s}_{t-T:t-1}$ as expressed in Equation 5.

$$p_t = \Sigma_{\tau=1}^T \alpha_\tau \hat{s}_{t-\tau} \quad \text{[Equation 5]}$$

In Equation 5, $\alpha_\tau$ may denote a prediction coefficient and $\hat{s}$ may denote a predicted sample.

The neural vocoder (N_V) may use the neural generative model (e.g., WaveRNN) to directly predict an excitation signal (or prediction residual) $e_t$ as expressed in Equation 6. The neural generative model may include one or more GRU layers, one or more fully-connected layers, and an activation layer.

$$\hat{e}_t = \mathcal{G}(p_t, \hat{s}_{<t}, \hat{e}_{<t})$$

$$\hat{s}_t = p_t + \hat{e}_t, \quad \text{[Equation 6]}$$

In Equation 6, $\mathcal{G}$ may denote the neural generative model (e.g., WaveRNN).

The decoder 160 may increase speech reconstruction quality by predicting the excitation signal $e_t$ using the neural vocoder (N_V).

The learning process of the decoder 160 may include a plurality of stages such as predictor ($F_{pre2}$) training, codebook learning, and vocoder training.

Figure 3:
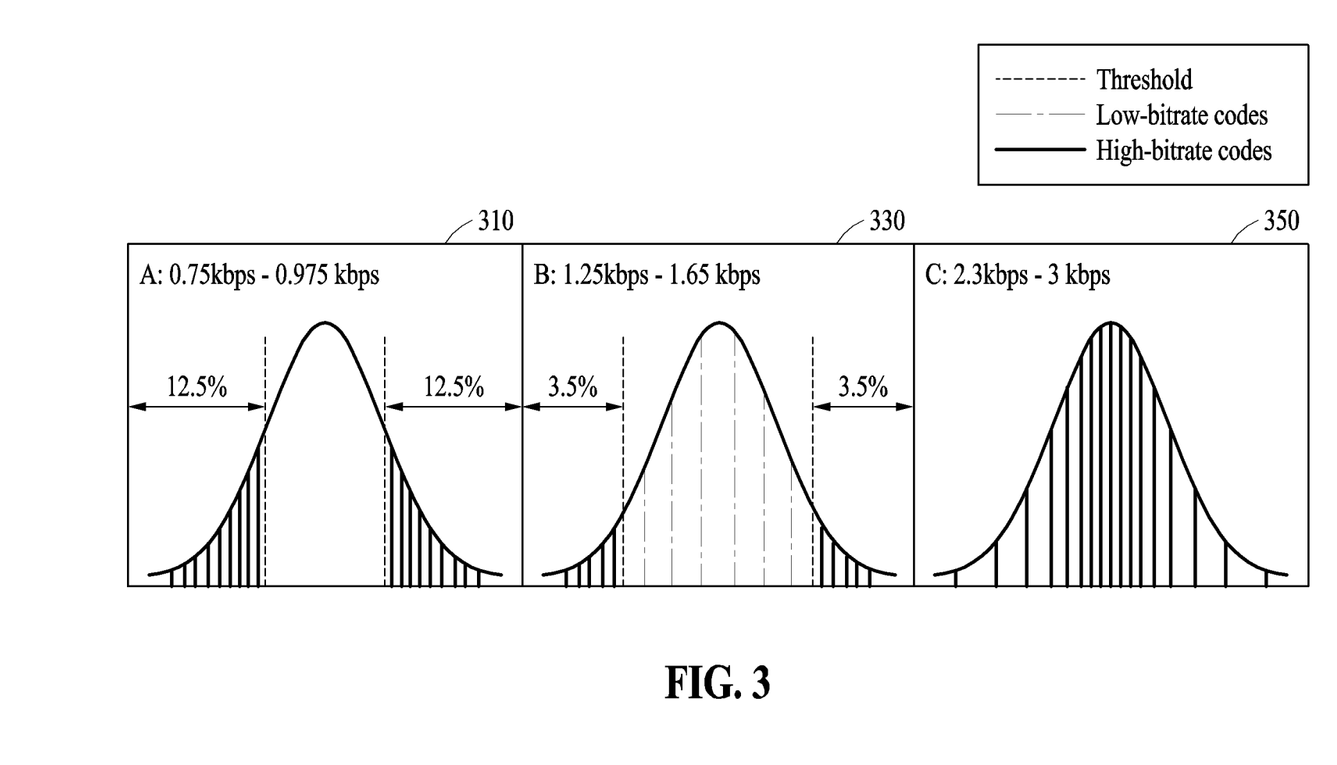
FIG. 3 is a diagram illustrating a codebook according to an embodiment.

FIG. 3 is a diagram illustrating a codebook according to an embodiment.

Referring to FIG. 3, according to an embodiment, an encoder (e.g., the encoder 110 of FIGS. 1 and 2) may apply discriminative coding to residual signals (e.g., the residual signals ($r_{n-1}$ and $r_n$) of FIG. 2) corresponding to a plurality of frames.

The encoder 110 may distinguish frames worthy of coding from other frames by setting an L1 norm of the residual signals as a threshold. The encoder 110 may assign different bits to the plurality of frames through thresholding. For example, the encoder 110 may assign more bits to a frame having significant residual energy.

The encoder 110 may determine a threshold value θ based on a target bitrate and perform a quantization process as expressed in Equation 7 based on the threshold value θ.

$$\bar{r} = Q(r) = \begin{cases} Q_{HBR}(r) & \text{if } \|r\|_1 \geq \theta \\ Q_{LBR}(r) & \text{otherwise,} \end{cases} \quad \text{[Equation 7]}$$

In Equation 7, $Q_{HBR}$ may denote a first quantization scheme and $Q_{LBR}$ may denote a second quantization scheme.

The first quantization scheme may include a high-bitrate quantization scheme and the second quantization scheme may include a low-bitrate quantization scheme. The first quantization scheme may use a larger codebook than the second quantization scheme.

When a target bitrate is significantly low, the encoder 110 may discard some residues without coding the residues. For example, codec A 310 may perform first quantization only on 25% of the residues and may not perform quantization on residues close to zero. Codec B 330 may perform the first quantization on some residues and may perform second quantization on the remaining residues. Codec C may perform the first quantization on all residues.

The encoder 110 may code a first component and the remaining components (or remaining dimensions) of a residual vector separately, similar to how LPCNet codes feature vectors. A high-energy area of the first component and high-energy areas of the remaining components do not co-occur. Thus, the encoder 110 may assign a threshold value and independently apply discriminative coding to a scalar component and a vector component.

Table 1 uses 18-dimensional cepstral coefficients as an example to show how the encoder 110 performs discriminative and multi-stage quantization based on the target bitrate. However, Table 1 is an example of the detailed description, and the scope of the disclosure should not be limited thereto.

TABLE 1

| | Target bitrate (kbps) | | | | | |
| --- | --- | --- | --- | --- | --- | --- |
| | ~0.95 | | ~1.4 | | ~2.7 | |
| Codebook Size (bits):Bitrate after Huffman Coding (kbps) | | | | | | |
| Stages | 1st | 2nd | 1st | 2nd | 1st | 2nd |
| $Q_{HBR}$ ($r_1$) | 8:7 | — | 8:7 | — | 8:7 | — |
| $Q_{LBR}$ ($r_1$) | 0:0 | — | 4:3 | — | — | — |
| $Q_{HBR}$ ($r_{2:18}$) | 10:10 | 10:10 | 10:9 | 10:10 | 10:9 | 10:9 |
| $Q_{LBR}$ ($r_{2:18}$) | 0:0 | — | 9:8 | — | — | — |

Referring to Table 1, for scalar quantization, a codebook of size 512 may be used in first quantization cases. On the other hand, in second quantization cases, only 16 codes may be used, or no code may be used when the target bitrate is low. A scalar quantizer may use a single-stage quantization scheme.

For vector quantization for $c_{2:18}$, in the first quantization cases, first-stage quantization and second-stage quantization may be used, and a codebook of size 1024 may be used in each stage. On the other hand, in the second quantization cases, single-stage quantization using the codebook of size 512 may be used, or coding may be omitted when a bitrate is significantly low (e.g., 0.95 kilobits per second (kbps) or less).

Figure 4:
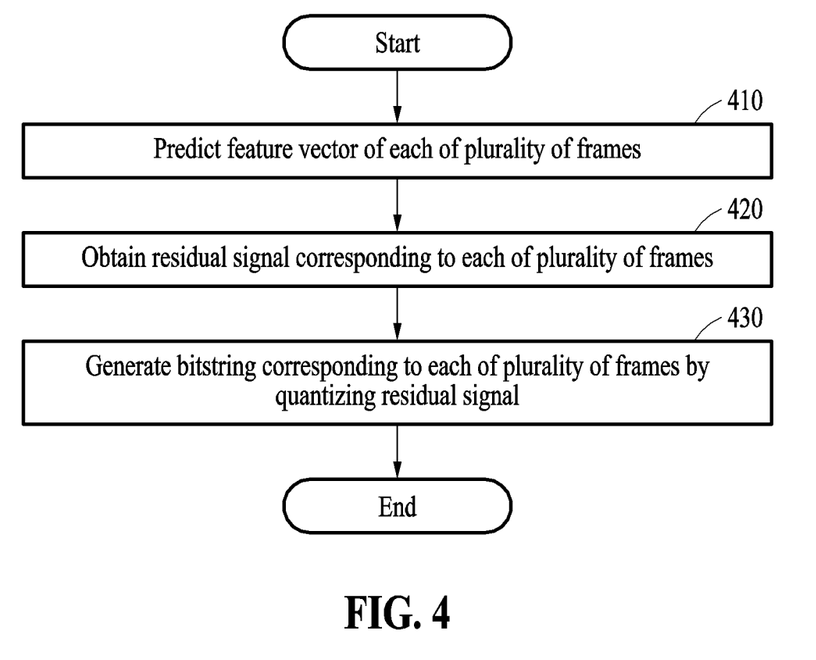
FIG. 4 is a flowchart illustrating an operation of an encoder according to an embodiment.

FIG. 4 is a flowchart illustrating an operation of an encoder according to an embodiment.

Referring to FIG. 4, according to an embodiment, operations 410 to 430 may be sequentially performed, however, embodiments are not limited thereto. For example, an order of operations 410 to 430 may change or at least two operations may be performed in parallel. Operations 410 to 430 may be substantially the same as the operations of the encoder (e.g., the encoder 110) described with reference to FIGS. 1 to 3. Accordingly, a repeated description thereof is omitted.

In operation 410, the encoder 110 may predict a feature vector of each (e.g., the n-th frame of FIG. 2) of a plurality of frames included in a speech signal (e.g., the speech signal of FIG. 1) based on a ground-truth feature vector (e.g., the ground-truth feature vector ($c_{n-1}$) of FIG. 2) of a previous frame (e.g., the n−1-th frame of FIG. 2) of each (the n-th frame) of the plurality of frames.

In operation 420, the encoder 110 may calculate a residual signal (e.g., the residual signal) ($r_n$) of FIG. 2) corresponding to each (e.g., the n-th frame) of the plurality of frames based on the ground-truth feature vector (e.g., the ground-truth feature vector ($c_n$) of FIG. 2) of each (e.g., the n-th frame) of the plurality of frames and a predicted feature vector (e.g., the predicted feature vector ($\hat{c}_n$) of FIG. 2) of each (e.g., the n-th frame) of the plurality of frames.

In operation 430, the encoder 110 may generate a bitstring corresponding to each (e.g., the n-th frame) of the plurality of frames by quantizing the residual signal (e.g., the residual signal ($r_n$)).

Figure 5:
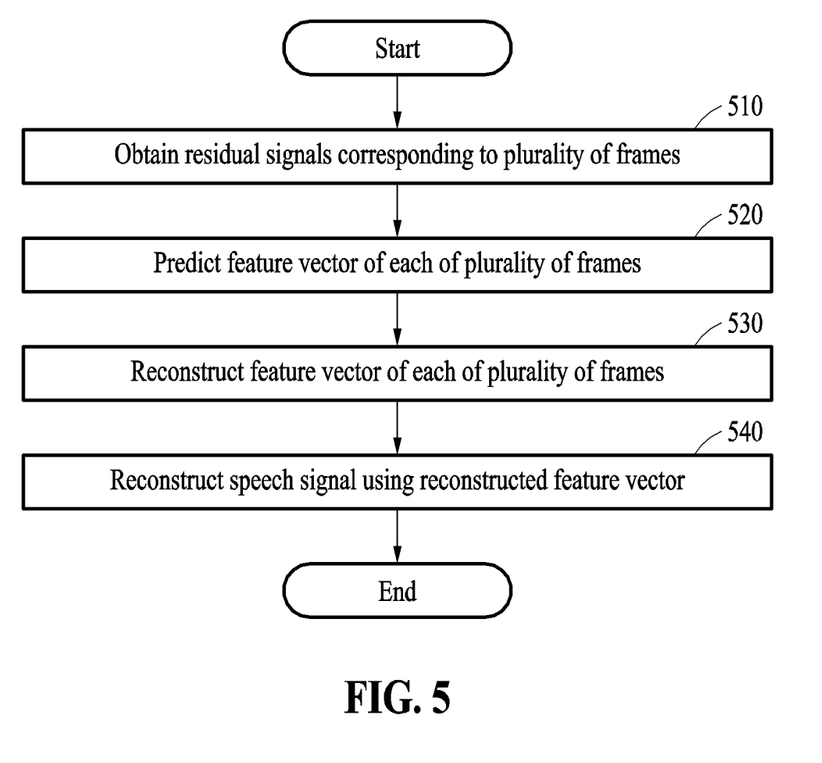
FIG. 5 is a flowchart illustrating an operation of a decoder according to an embodiment.

FIG. 5 is a flowchart illustrating an operation of a decoder according to an embodiment.

Referring to FIG. 5, according to an embodiment, operations 510 to 540 may be sequentially performed, however, embodiments are not limited thereto. An order of operations 510 to 540 may change or at least two operations may be performed in parallel. Operations 510 to 540 may be substantially the same as the operations of the decoder (e.g., the decoder 160 of FIGS. 1 and 2) described with reference to FIGS. 1 and 2. Accordingly, a repeated description thereof is omitted.

In operation 510, the decoder 160 may obtain quantized residual signals (e.g., the quantized residual signals ($\bar{r}_{n-1}$ and $\bar{r}_n$) of FIG. 2) corresponding to a plurality of frames included in a speech signal (e.g., the speech signal of FIG. 1).

In operation 520, the decoder 160 may predict a feature vector of each (e.g., the n-th frame of FIG. 2) of the plurality of frames based on quantized residual signals (e.g., the quantized residual signals ($\bar{r}_{n-1}$)) corresponding to a previous frame (e.g., the n−1-th frame of FIG. 2) of each (e.g., the n-th frame) of the plurality of frames.

In operation 530, the decoder 160 may reconstruct the feature vector of each (e.g., the n-th frame) of the plurality of frames using a predicted feature vector (e.g., the predicted feature vector ($\hat{c}_n$) of FIG. 2) of each (e.g., the n-th frame) of the plurality of frames and a quantized residual signal (e.g., the quantized residual signal ($\bar{r}_n$)) corresponding to each (e.g., the n-th frame) of the plurality of frames.

In operation 540, the decoder 160 may reconstruct the speech signal using the reconstructed feature vector (e.g., the reconstructed feature vector ($\bar{c}_n$) of FIG. 2) of each (e.g., the n-th frame) of the plurality of frames.

Figure 6:
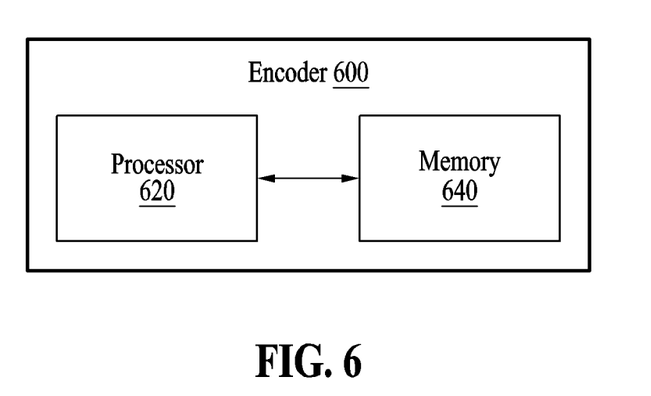
FIG. 6 is a schematic block diagram illustrating an encoder according to an embodiment.

FIG. 6 is a schematic block diagram illustrating an encoder according to an embodiment.

Referring to FIG. 6, according to an embodiment, an encoder 600 (e.g., the encoder 110 of FIGS. 1 and 2) may include a memory 640 and a processor 620.

The memory 640 may store instructions (or programs) executable by the processor 620. For example, the instructions may include instructions for executing an operation of the processor 620 and/or instructions for executing an operation of each component of the processor 620.

The memory 640 may include one or more computer-readable storage media. The memory 640 may include non-volatile storage elements (e.g., a magnetic hard disc, an optical disc, a floppy disc, flash memory, electrically programmable memory (EPROM), and electrically erasable and programmable memory (EEPROM)).

The memory 640 may be a non-transitory medium. The term "non-transitory" may indicate that a storage medium is not embodied in a carrier wave or a propagated signal. However, the term "non-transitory" should not be interpreted to mean that the memory 640 is non-movable.

The processor 620 may process data stored in the memory 640. The processor 620 may execute computer-readable code (e.g., software) stored in the memory 640 and instructions triggered by the processor 620.

The processor 620 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

Operations performed by the processor 620 may be substantially the same as the operations of the encoder 110 described with reference to FIGS. 1 to 4. Accordingly, a detailed description thereof is omitted.

Figure 7:
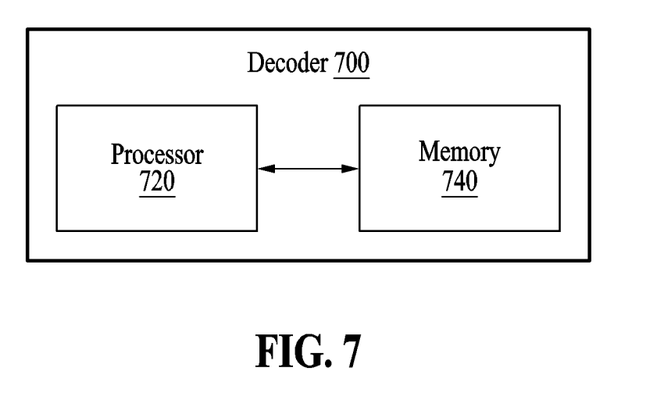
FIG. 7 is a schematic block diagram illustrating a decoder according to an embodiment.

FIG. 7 is a schematic block diagram illustrating a decoder according to an embodiment. Referring to FIG. 7, according to an embodiment, a decoder 700 (e.g., the decoder 160 of FIGS. 1 and 2) may include a memory 740 and a processor 720.

The memory 740 may store instructions (or programs) executable by the processor 720. For example, the instructions may include instructions for executing an operation of the processor 720 and/or instructions for executing an operation of each component of the processor 720.

The memory 740 may include one or more computer-readable storage media. The memory 740 may include non-volatile storage elements (e.g., a magnetic hard disc, an optical disc, a floppy disc, flash memory, EPROM, and EEPROM).

The memory 740 may be a non-transitory medium. The term "non-transitory" may indicate that a storage medium is not embodied in a carrier wave or a propagated signal. However, the term "non-transitory" should not be interpreted to mean that the memory 540 is non-movable.

The processor 720 may process data stored in the memory 740. The processor 720 may execute computer-readable code (e.g., software) stored in the memory 740 and instructions triggered by the processor 720.

The processor 720 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

Operations performed by the processor 720 may be substantially the same as the operations of the decoder 160 described with reference to FIGS. 1, 2, and 5. Accordingly, a detailed description thereof is omitted.

Figure 8:
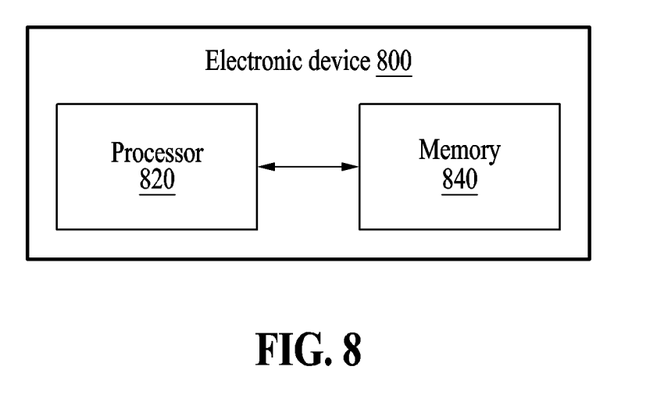
FIG. 8 is a schematic block diagram illustrating an electronic device according to an embodiment.

FIG. 8 is a schematic block diagram illustrating an electronic device according to an embodiment.

Referring to FIG. 8, according to an embodiment, an electronic device 800 may include a memory 840 and a processor 820.

The memory 840 may store instructions (or programs) executable by the processor 820. For example, the instructions may include instructions for executing an operation of the processor 820 and/or instructions for executing an operation of each component of the processor 820.

The memory 840 may include one or more computer-readable storage media. The memory 840 may include non-volatile storage elements (e.g., a magnetic hard disc, an optical disc, a floppy disc, flash memory, EPROM, and EEPROM).

The memory 840 may be a non-transitory medium. The term "non-transitory" may indicate that a storage medium is not embodied in a carrier wave or a propagated signal. However, the term "non-transitory" should not be interpreted to mean that the memory 540 is non-movable.

The processor 820 may process data stored in the memory 840. The processor 820 may execute computer-readable code (e.g., software) stored in the memory 840 and instructions triggered by the processor 820.

The processor 820 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

Operations performed by the processor 820 may be substantially the same as the operations of the encoder (e.g., the encoder 110 of FIGS. 1 and 2) described with reference to FIGS. 1 to 4 and the operations of the decoder (e.g., the decoder 160 of FIGS. 1 and 2) described with reference to FIGS. 1, 2, and 5. Accordingly, a detailed description thereof is omitted.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A method of encoding a speech signal, the method comprising:
   predicting a feature vector of each of a plurality of frames comprised of the speech signal based on a ground-truth feature vector of a previous frame of each of the plurality of frames;
   calculating a residual signal corresponding to each of the plurality of frames based on a ground-truth feature vector of each of the plurality of frames and a predicted feature vector of each of the plurality of frames; and
   generating a bitstring corresponding to each of the plurality of frames by quantizing the residual signal,
   wherein the generating of the bitstring comprises:
      determining a threshold value related to energy of the residual signals, based on a target bitrate for the bitstring; and
      applying a first quantization scheme or a second quantization scheme to the residual signal based on the residual signal and the threshold value.

2. The method of claim 1, wherein the predicting of the feature vector of each of the plurality of frames comprises:
   reconstructing a feature vector of the previous frame using a quantized residual signal corresponding to the previous frame and a predicted feature of the previous frame; and
   obtaining the predicted feature vector of each of the plurality of frames from a reconstructed feature vector of the previous frame using a recurrent neural network.

3. The method of claim 1, wherein the first quantization scheme uses a larger codebook than the second quantization scheme.

4. The method of claim 2, wherein the recurrent neural network comprises a gated recurrent unit.

5. A method of decoding a speech signal encoded by the encoding method of claim 1, the method comprising:
   obtaining quantized residual signals corresponding to a plurality of frames of the speech signal;
   predicting a feature vector of each of the plurality of frames based on a quantized residual signal corresponding to a previous frame of each of the plurality of frames;
   reconstructing a feature vector of each of the plurality of frames using a predicted feature vector of each of the plurality of frames and a quantized residual signal corresponding to each of the plurality of frames; and
   reconstructing the speech signal using a reconstructed feature vector of each of the plurality of frames.

6. The method of claim 5, wherein the predicting of the feature vector of each of the plurality of frames comprises:
   reconstructing a feature vector of the previous frame using a predicted feature vector of the previous frame and a quantized residual signal corresponding to the previous frame; and
   obtaining the predicted feature vector of each of the plurality of frames from a reconstructed feature vector of the previous frame using a recurrent neural network.

7. The method of claim 5, wherein the reconstructing of the speech signal comprises generating a reconstructed speech signal corresponding to the speech signal by inputting the reconstructed feature vector to a neural vocoder.

8. The method of claim 6, wherein the recurrent neural network comprises a gated recurrent unit.

9. The method of claim 7, wherein the neural vocoder comprises an LPCNet vocoder.

10. An apparatus for encoding a speech signal, the apparatus comprising:
    a memory configured to store instructions; and
    a processor electrically connected to the memory and configured to execute the instructions,
    wherein, when the instructions are executed by the processor, the processor is configured to perform a plurality of operations, and
    wherein the plurality of operations comprises:
       predicting a feature vector of each of a plurality of frames comprised of the speech signal based on a ground-truth feature vector of a previous frame of each of the plurality of frames;
       calculating a residual signal corresponding to each of the plurality of frames based on a ground-truth feature vector of each of the plurality of frames and a predicted feature vector of each of the plurality of frames; and
       generating a bitstring corresponding to each of the plurality of frames by quantizing the residual signal,
    wherein the generating of the bitstring comprises:
       determining a threshold value related to energy of the residual signals, based on a target bitrate for the bitstring; and
       applying a first quantization scheme or a second quantization scheme to the residual signal based on the residual signal and the threshold value.

11. The apparatus of claim 10, wherein the predicting of the feature vector of each of the plurality of frames comprises:
- reconstructing a feature vector of the previous frame using a quantized residual signal corresponding to the previous frame and a predicted feature vector of the previous frame; and
- obtaining the predicted feature vector of each of the plurality of frames from a reconstructed feature vector of the previous frame using a recurrent neural network.

12. The apparatus of claim 10, wherein the first quantization scheme uses a larger codebook than the second quantization scheme.

13. The apparatus of claim 11, wherein the recurrent neural network comprises a gated recurrent unit.

14. A non-transitory computer-readable storage medium storing instructions that, when executed by a processor, cause the processor to perform the method of claim 1.

* * * * *